Patented Oct. 27, 1925.

1,559,399

UNITED STATES PATENT OFFICE.

ALFRED R. AUTREY, OF PORT ARTHUR, TEXAS.

PROCESS OF DECOLORIZING AND REFINING GUMS AND RESINOUS PRODUCTS OF CONIFEROUS PINE TREES.

No Drawing.     Application filed August 13, 1924.  Serial No. 731,870.

*To all whom it may concern:*

Be it known that I, ALFRED R. AUTREY, a citizen of United States, residing at Port Arthur, in the county of Jefferson and State of Texas, have invented new and useful Improvements in Processes of Decolorizing and Refining Gums and Resinous Products of Coniferous Pine Trees, of which the following is a specification.
The present invention relates to improvement in the recovery of resinous material and turpentine from the crude gum, sap, extracts, scrape or other fluids or solids derived from coniferous pine trees (long leaf pine) used in the production of naval stores.

As the first step of the process, starting with the liquid and solid material together, the solids are separated from the liquid by decantation or otherwise. The solid material is then placed in a closed container and is heated by means of steam, preferably in a covered boiler or other receptacle, sufficiently to liquefy the solid material (solid extract or scrape).
The material, solid and melted liquid, is then passed preferably separately through a strainer or a coarse filter to remove foreign matter such as scraps of wood, bark, sand and leaves and the like. This filtering operation can be conducted by the use of a thin cloth such as cheese cloth or the like.

The next step in the process consists of treating the filtered material, preferably while still in a liquid condition, with prepared fuller's earth, the earth previously having been heated in order to drive out all its moisture. Without limiting myself to details, I will state that fuller's earth which has been kiln dried, at a temperature of about 750° F. and then has been passed through a 60 or 70 mesh screen, has been found to be very satisfactory when used in the proportion of about 1%. The melted material and the fuller's earth can be agitated together for an hour or so, if desired. It will be understood, however, that other proportions can be used, and the material can be dried at a higher or a lower temperature, and can be passed through a coarser or finer filtering medium than above indicated. This fuller's earth may be added to and mixed with the melted scrape, while the latter is at a temperature of about 135 to 155° F., although here again the temperature selected can vary a good deal, depending upon the quality of the material being treated, and various other conditions. The treatment with fuller's earth very considerably bleaches the gum so that the same is ably "decolored" or brightened by the use of fuller's earth as indicated.

The material is then again filtered, for instance, through cotton batting or other suitable media, in order to remove the fuller's earth.

The purified material, after removal of the fuller's earth, is run into a still, and is then distilled, while preferably being constantly agitated by blowing steam therethrough. The better grade of crude gum is preferably distilled at about atmospheric pressure, while if low grade crude gum is under treatment, this is preferably subjected to distillation under a pressure substantially below atmospheric and the temperature of the distilling operation, in both cases should be below about 315° F. At any event the temperature should not very substantially exceed this. If a vacuum is used, the degree of vacuum can vary a good deal, and when using a vacuum there has been found to be very satisfactory results produced. The "Dutch oven" type of furnace is preferably used for heating the still in order to insure a very even distribution of the heat, and thereby prevent local overheating.

The rosin, or residue remaining in the still is filtered through a close filter, such as cotton batting—thick—in order to remove all foreign matter. This filtration is preferably effected immediately after the discharge of the material from the still, and the filter box is preferably maintained at a temperature of between 150 and 300° F., in order to prevent solidification of the material in the filter.

The filtered material is a very high grade pale rosin or resin, even when produced form a low grade of crude gum. The amount of the rosin produced is also unusually high, because there is substantially no decomposition of the same taking place during the distillation treatment.

The distillate above referred to can be agitated with animal charcoal and then can be fractionated if desired, although this latter is not always necessary. The animal charcoal used should preferably be first separated by sifting and the portion which passes a 50 mesh screen and which is retained by a 70 mesh screen is the portion which is best suited to be used for the treatment of this distillate. About 5 pounds of this material are well agitated with 100 pounds of the distillate, after which the same is filtered.

There is a substantially larger yield of spirits of turpentine produced by the present process than by the processes heretofore in common use. The turpentine also is of a better quality and is free from impurities, and is perfectly clear and water white. The turpentine possesses a very pleasant odor and is free from the "burnt" odor which is found in low grades of turpentine, particularly that which has been overheated during the distillation treatment.

I claim:

1. A process which comprises agitating gum turpentine material with dried fuller's earth and filtering, thereafter distilling with steam at a temperature not above 315° F.
2. A process which comprises agitating gum turpentine material in a molten condition with dried fuller's earth, removing the fuller's earth and distilling the said turpentine material with steam at a temperature not over 315° F. and decolorizing the distillate with animal charcoal.
3. A process which comprises agitating gum turpentine material with dried fuller's earth, filtering and thereafter distilling.
4. A process which comprises agitating gum turpentine material with fuller's earth and thereafter distilling.

In testimony whereof I affix my signature.

ALFRED R. AUTREY.